Oct. 9, 1928.
J. O. BISHOP
TORCH OPERATING MECHANISM
Filed Sept. 22, 1926
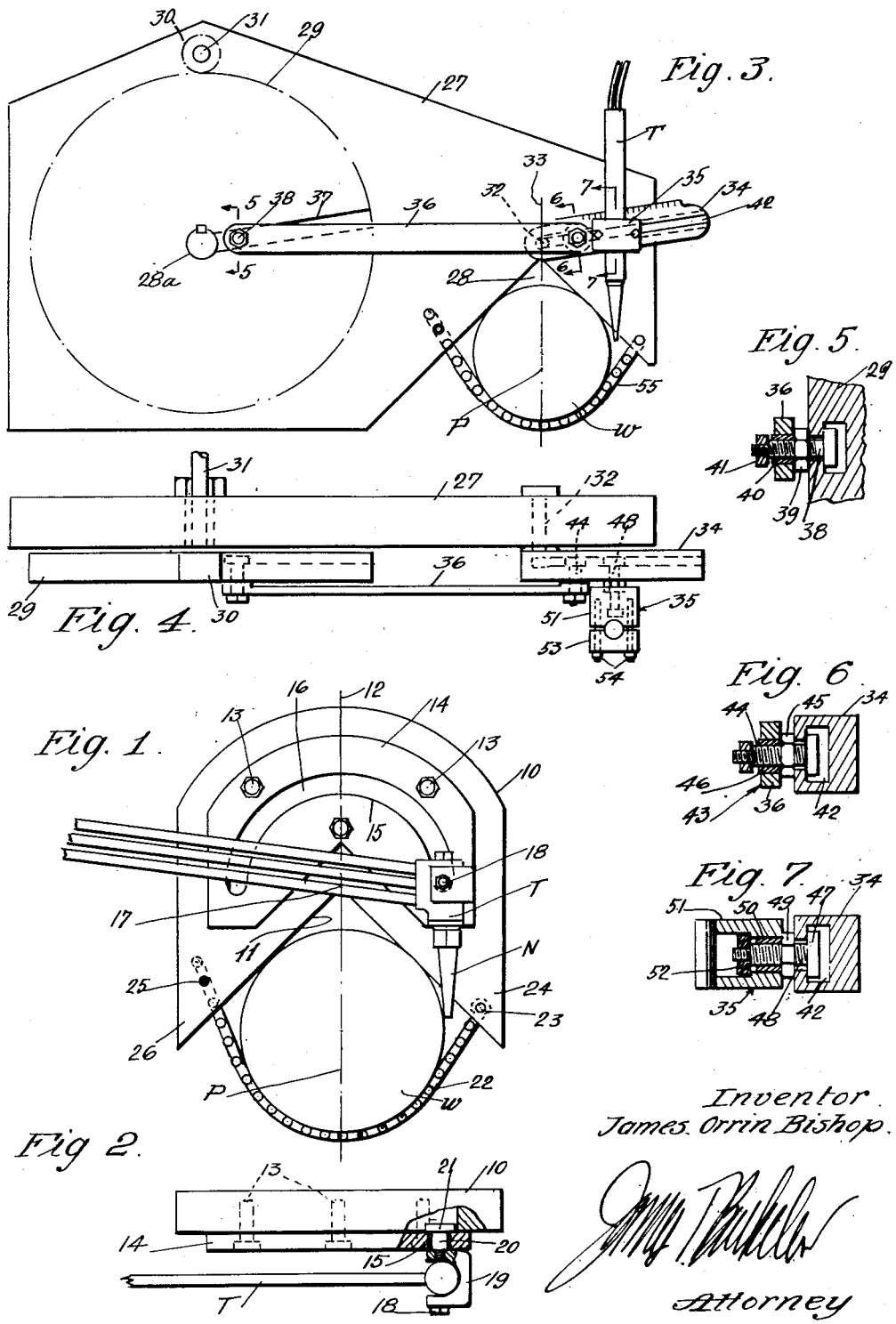
Inventor.
James Orrin Bishop.
Attorney

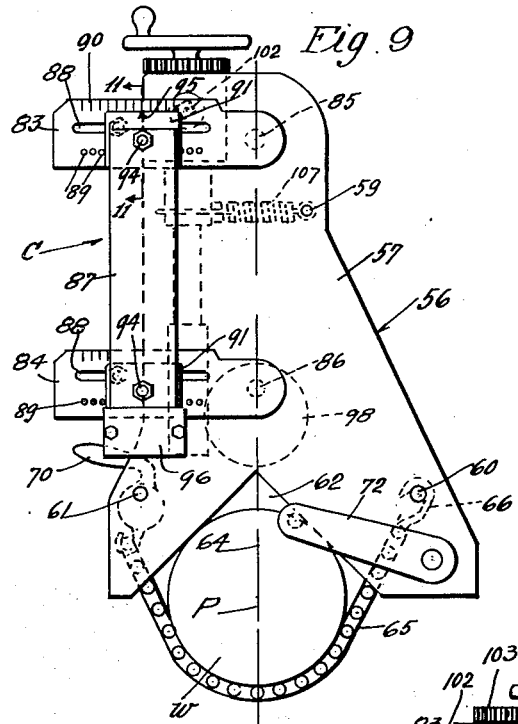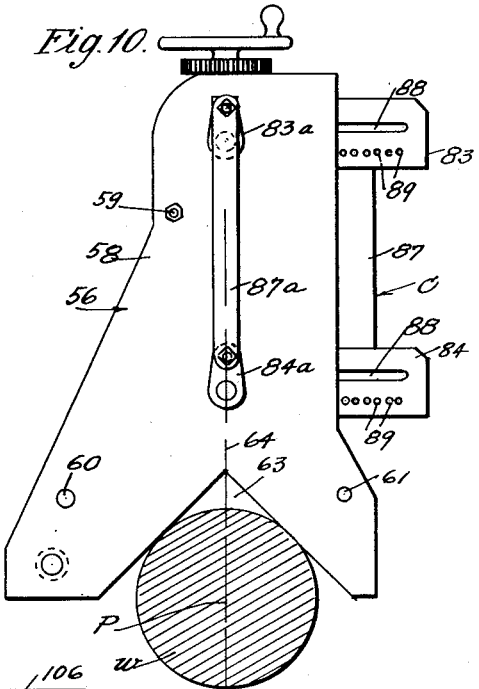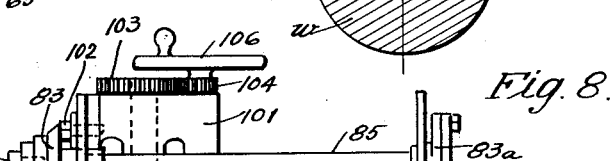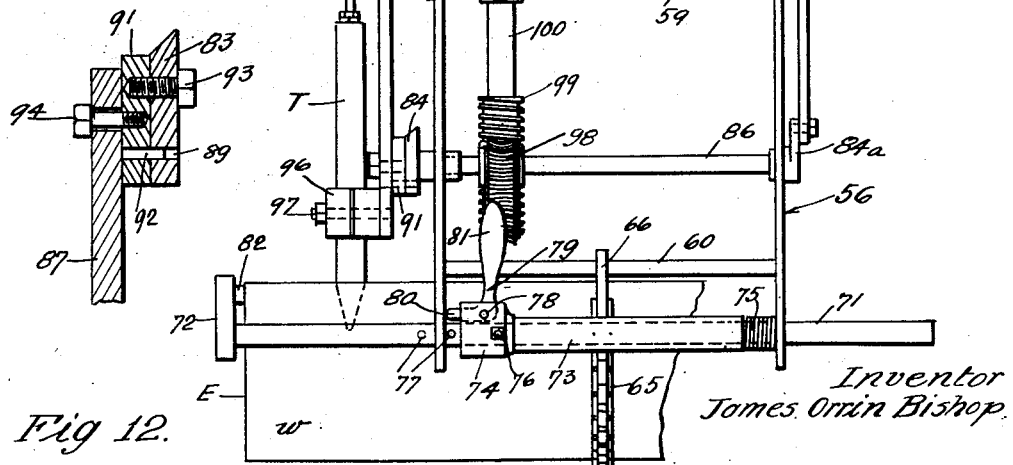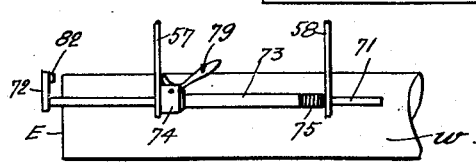

Oct. 9, 1928.
J. O. BISHOP
TORCH OPERATING MECHANISM
Filed Sept. 22, 1926   3 Sheets-Sheet 3
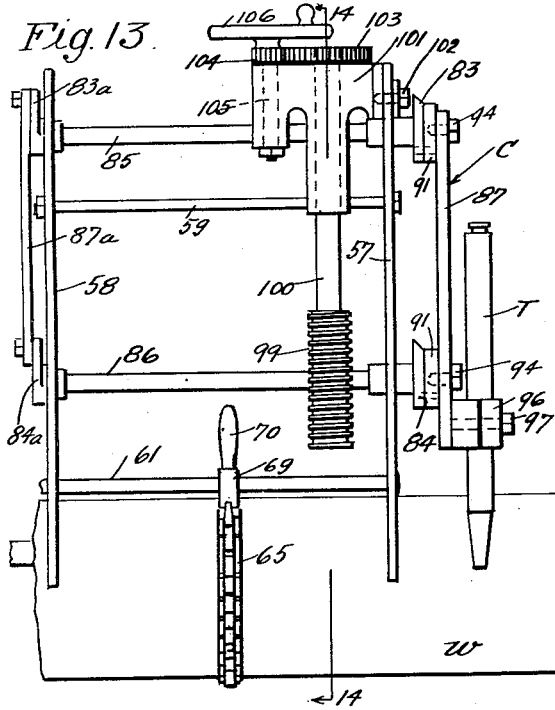
Fig. 13.
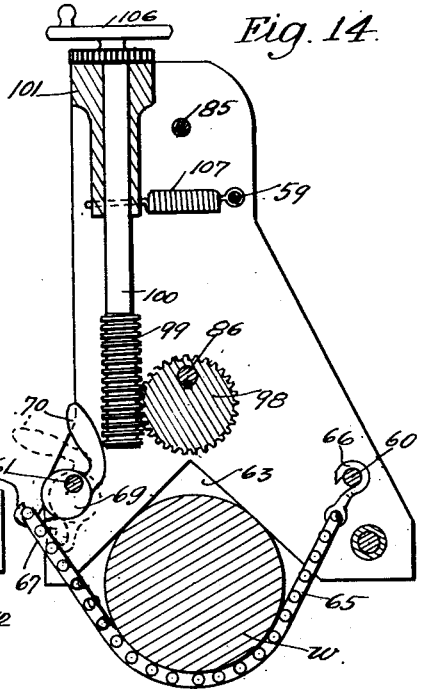
Fig. 14.
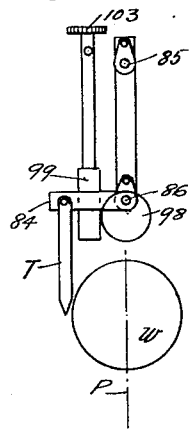
Fig. 15.
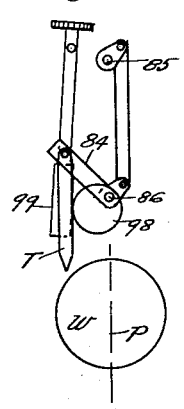
Fig. 16.
Fig. 17.
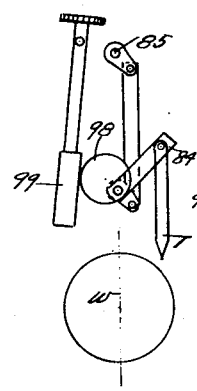
Fig. 18.
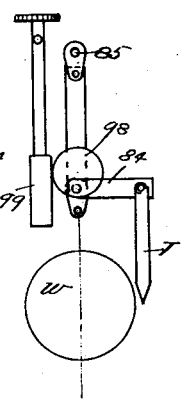
Fig. 19.
Inventor
James Orrin Bishop
Attorney.

Patented Oct. 9, 1928.

1,687,001

UNITED STATES PATENT OFFICE.

JAMES ORRIN BISHOP, OF TORRANCE, CALIFORNIA.

TORCH-OPERATING MECHANISM.

Application filed September 22, 1926. Serial No. 137,159.

This invention has to do generally with torch operating machines, that is, devices whereby cutting torches are supported in a manner to be moved through predetermined paths with relation to work, the latter preferably, though not necessarily, being held stationarily; and is also concerned with means for moving torches through such paths.

While the work operated upon by the torch may be of any character, within reasonable limits, the machine is particularly well adapted to the cutting of bar stock of relatively large cross-section. I have here shown an embodiment of the invention particularly adapted for the cutting of round stock, and from an understanding of this embodiment it will be readily understood by those skilled in the art how the invention may be embodied in devices for cutting stock having other cross-sectional characteristics, for instance, hexagonal. Therefore, the invention, considered in its broader aspects, is in no way to be considered as limited to the particular embodiment illustrated.

The first consideration is the provision of a device whereby the torch will substantially follow the curvature of the work or a portion of its cross-section outline so the nose or nozzle is kept at substantially uniform distance from the work. With this condition existing, and with the torch flame at its most efficient size and distance from the work, it is insured that an even kerf will be cut without constant adjustment of the nozzle, it thus being insured that the cut-ends of the stock will be even and smooth, an obvious advantage.

The next consideration is the provision of efficient mechanical means for moving the torch through the predetermined path, and as an example of such means I have illustrated in certain figures a simple crank arrangement.

In cutting relatively thin pipe or tubular stock, it is feasible to move the torch so the axis of its nozzle constantly extends radially with respect to the work. However, in cutting solid stock of any appreciable size, it is undesirable that the nozzle be so held throughout its movement. The reason for this is that the molten metal naturally has a tendency to gravitate as the cutting proceeds across the stock, and unless it has a clear, substantially vertical path, it tends to gather and interfere with efficient and clean cutting. Such interference results when the nozzle extends radially with respect to the work except at such a time as said nozzle is directly over the work axis. Consequently, in cutting solid stock, it is highly desirable that the torch be held substantially erect or vertical at all times, it following that the molten metal may run or drop clear of the work as fast as the cut proceeds. As a simple, efficient means for accomplishing this, I have provided in the preferred embodiment of my invention a system of cranks and linkage for supporting the torch, carrying it through its arcuate path, and maintaining it substantially erect during such movement.

While it is not essential to the operation of the device, considering the invention in its broader aspects, that the cut progress by virtue of the horizontal component of the torch movement, it is preferable that this be true when solid stock is cut, for the reasons given above, and therefore it will hereinafter be considered that the device is arranged with respect to the work in such a manner that the initial cut is at one side of the vertical axial plane thereof and moves through said axial plane to the opposite side. This is not to be considered as limitative on the invention, however. It follows that as the torch, constantly erect, moves toward the vertical axial plane, it is constantly called upon to cut through a greater vertical extent of metal, and as it leaves said vertical axial plane it is called upon to cut a gradually diminishing extent. Consequently, with the torch flame of uniform size, it will be seen that the torch should move horizontally with constantly diminishing speed as it approaches said axial plane and should be constantly accelerated during its departure from said plane. Now when cranks are depended upon for moving the torch through its arcuate path, it will be seen, in the absence of compensating means, that just the opposite effect results, for during a given unit of angular movement of the torch towards the vertical axial plane, the horizontal component of movement increases, so, with the angular velocity uniform, as the torch approaches said plane the horizontal speed of the torch is positively accelerated. As the torch moves from said plane conditions are reversed, that is, the torch moves horizontally with diminishing speed.

Therefore, when crank means are provided for swinging the torch, and it is desired that the drive be automatic, it is necessary to provide compensation for this particular variance in horizontal speed, and it is highly desirable that the operation actually reverse the conditions, that is, move the torch horizontally more slowly as it approaches the vertical axial plane and accelerate said horizontal movement as it leaves said plane.

Where the device is operated by hand it is possible to control the torch movement to give the desired variable speed of horizontal travel by proper manipulation of the driving means, but this calls for considerable knowledge and nicety of operation. Therefore, I have devised means whereby this compensation is gained automatically, the operator being enabled to turn the drive shaft at constant speed while the torch moves at the proper variable speed. By virtue of such compensating means it is then possible to operate the machine entirely automatically, applying any type of driving mechanism, such as an electric motor, to the drive shaft, and driving said shaft at uniform speed. The advantage of this feature is self-evident.

As a particularly simple and effective compensating means, I employ in the drive connection between the drive shaft and the crank arms an element such as an eccentrically mounted gear or its equivalent an elliptical gear. Such gears may be considered as being of variable effective diameter, that is, assuming a drive pinion or worm be applied to this gear, the passage of different given peripheral extents of the gear past the pinion, gives different degrees of angular movement of said gear, and therefore of the shaft with which it is operatively connected. With the pinion shaft driven at uniform angular velocity and with the peripheral extent of the gear passed during unit time thus remaining constant, the angular velocity of said gear is variable. With the gear properly set, it causes negative angular acceleration of the cranks and hence of the nozzle as the latter approaches the vertical axial plane of the work, and positive acceleration as the nozzle leaves said plane and approaches the other side of the work, the desired result.

Other features of novelty and objects of the invention will be made apparent in the following detailed specification, reference being had to the accompanying drawings, in which:

Fig. 1 is an elevation of a device embodying my invention;

Fig. 2 is a top plan view of Fig. 1, parts being shown in broken away section;

Fig. 3 illustrates a variant form of my device;

Fig. 4 is a top plan view of Fig. 3;

Fig. 5 is an enlarged section on line 5—5 of Fig. 3;

Fig. 6 is an enlarged section on line 6—6 of Fig. 3;

Fig. 7 is an enlarged section on line 7—7 of Fig. 3;

Fig. 8 is a side elevation of the preferred embodiment of my invention;

Fig. 9 is a view of Fig. 8 looking from the left thereof;

Fig. 10 is a view of Fig. 8 looking from the right thereof;

Fig. 11 is an enlarged section on line 11—11 of Fig. 9;

Fig. 12 is a reduced fragmentary view showing the gauge stop in a position different from that shown in Fig. 8;

Fig. 13 is a view of the device as viewed from the side opposite that of Fig. 8;

Fig. 14 is a section on line 14—14 of Fig. 13; and

Figs. 15 to 19, inclusive, are diametric views illustrating different positions of the torch during a single operation thereof.

Any of the variant embodiments of the invention described below may either be of the stationarily mounted type to which work is brought or of the portable type brought to the work. However, it will facilitate description if we hereinafter consider the devices as stationarily mounted and the work brought and held to it.

In Fig. 1 numeral 10 designates the body or frame of the device, said body preferably, though not necessarily, having a centering V-notch 11 whereby work of different diameters, within reasonable limits, may be taken and centered. Preferably, this notch is such that the bisector 12 thereof is vertical, it following that said bisector lies in the vertical axial plane of work W, irrespective of the diameter of said work.

Bolts 13 serve as detachable means for holding a form-plate or cam 14 to member 10, it thus being possible to affix to the body member any desired form-plate having such characteristics as will serve to guide the cutting torch T through the path necessary to cut efficiently the particular work which may be clamped to the body member. Where the path is to be arcuate, the given form-plate 14 will have an arcuate guide or cam face 15 which has substantially the same degree of curvature as the given work, and where the cross-section of the work is other than round, the form-plate will have a cam face corresponding to face 15 but shaped to conform substantially with a portion of the periphery of the work.

Cam face 15 may be formed conveniently as one wall of the arcuate channel or way 16, and it is preferable that the center of the curvature 17 be in bisector 12 and hence lie in the vertical axial plane P of work W so, when the torch is at the highest point of face 15 the torch nozzle will be directly over the axis of the work, for reasons that will be apparent.

Any suitable means may be provided for holding the torch to plate 14 so it will follow the curvature of face 15, for instance, as illustrated in Fig. 2, the torch may be clamped by screw 18 within the U-clamp 19, the latter carrying a stud 20, said stud extending through slot 16 in plate 14 and having a head 21 adapted to prevent longitudinal displacement of said stud and the clamp in a direction away from member 10. The stud extends with its axis substantially parallel with the axis of the work and has a sufficiently loose fit within slot 16 to allow it to be moved arcuately therethrough and also to allow swivel motion of the U-clamp and torch so the torch and nozzle N may be held erect or vertical as the torch moves arcuately, all to the end described above. Slot 16 is preferably such that when stud 20 is at one end thereof, the nozzle end is approximately in horizontal alinement with the center of the work, though this condition is not imperative, and movement of stud 20 through slot 16 causes nozzle N to travel through a plane substantially parallel to a cross-section plane of the work and to follow quite closely the curvature or a portion of the cross-section outline of the work, it following that the nozzle tip remains substantially at uniform distance from the periphery of the work with the result that the cut will be uniform without necessitating change of the cutting frame.

As the operator draws the torch towards the axial plane P he should gradually reduce the speed of movement in order to compensate for the increased vertical extent of the work, and should increase the speed of arcuate travel as the torch leaves the axial plane and approaches the other side. The reasons for this are self-evident.

Of course, if pipe is being cut, or if he desires so to operate the torch on solid stock, he may swing the torch about stud 20 and out of vertical.

It will be noted that while face 15, alone, is necessary to guide the torch in its movement, that by the provision of slot 16 and the headed stud 21, the torch is confined to such movement.

Any suitable means may be provided for clamping the work to the body member, for instance, I may provide a chain 22 hooked at one end 23 to furcation 24 of member 10 and adjustably secured to a pin 25 or the like on the other furcation 26, this provision making it possible to clamp work of different sizes to the body member.

In Figs. 3 to 7, inclusive, I have illustrated a crank mounting for the torch and means for operating this crank in a manner to swing the torch through an arcuate path. Numeral 27 indicates a body member having a V-centering notch 28; preferably similar in character to notch 11, and carrying a crank shaft 28ᵃ having a crank gear 29 with which a pinion 30 on drive shaft 31 meshes.

Crank shaft 32 preferably lies in the bisector 33 of notch 28 and hence in the vertical axial plane P of work W. Shaft 32 also extends axially parallel to the work and carries a crank 34 which, in turn, supports an adjustable carriage or clamp-block 35 whereby torch T is held. Crank gear 29 and crank arm 34 are connected by a link or connecting rod 36 in any suitable manner. Preferably, however, link 36 is adjustable to vary the effective lengths of crank 29 in order that the throw thereof may be varied. This adjustability may be gained by connections shown in Figs. 5 and 6. Crank gear 29 has a radially extending T-slot 37 within which is carried a headed stud 38. This stud may be slid through the slot to a predetermined position of adjustment and then clamped in this adjusted position by lock nut 39, thus varying the throw of the crank gear. Stud 38 carries a bushing 40 on which is mounted link 36, retention nut 41 holding the link from accidental displacement. This connection gives the freedom of pivotal movement necessary to the connection between crank and link.

Crank 34 has a longitudinally extending T-slot 42 and a connection generally indicated at 43 which is similar to that disclosed in Fig. 5, stud 44 of this connection being movable longitudinally through the slot, being clamped in adjusted position by nut 45, and having the bushed connection 46 with link 36. When the link is set in any given position of adjustment, the crank arm and crank gear are first arranged so slots 37 and 42 are substantially parallel.

Carriage 35 is adjustably secured to crank 34 in any suitable manner. For instance, head 47 of stud 48 is adapted to slide through slot 42, the stud being clamped in adjusted position by lock nut 49. Stud 48 carries a bushing 50 on which the base part 51 of the carriage block 35 is mounted for axial rotation, a retention nut 52 holding part 51 from accidental displacement. Torch T is clamped between part 51 and cap 53 by bolts 54. It will thus be evident that block 35 and hence torch T are swively connected to arm 34 and may be adjusted longitudinally along said arm to vary the effective length of the crank. The crank shaft 32 is substantially parallel to the axis of work W, and due to its location, with torch T adjusted so the effective length of the crank is substantially equal to the radius of work W, angular movement of the crank arm causes torch T to follow an arcuate path through a plane substantially parallel to a cross-section plane of the work and substantially to follow the curvature of the work W. Due to the swivel connection between block 35 and arm 34, torch T may be held erect during movement of the crank arm, or it may be inclined at different angles with respect to the horizontal should such inclination be desired.

It will be noted that the swinging movement of crank arm 34 and hence of the torch is accomplished through rotation of pinion 30 which actuates crank gear 29 and connecting rod 36.

Chain 55 provides convenient means for holding the work to the clamp, in the manner described in connection with chain 22 of Fig. 1.

In the remaining figures of the drawings I have illustrated the preferred embodiment of my invention wherein the general features described above are found, but the preferred embodiment includes certain refinements and additional features which make it particularly efficient in operation.

Frame or body member 56 includes the two spaced side plates 57 and 58 and cross braces or rods 59, 60 and 61. Plates 57 and 58 are provided with downwardly opening and horizontally alined centering V-notches 62 and 63, respectively, these notches preferably having the characteristics described in connection with notches 11 and 28, that is, their bisectors 64 are substantially vertical or are coincidental with the extended, vertical axial plane P of work W, irrespective of the diameter of said work.

I have shown novel means both for clamping the work to the body member and for gauging the length of stock to be cut off during each cutting operation, said gauge being particularly useful where a given task consists in severing a plurality of pieces of uniform length from bar stock. While I will describe the work-holding and gauging means with some particularity, and while these means are, so far as I am aware, novel in themselves and are made the subject-matter of certain of my claims, it will be understood my invention, considered in its broader aspects, is not limited to these particularities.

My improved holding means includes a chain at 65 hooked at one end 66 over brace rod 60, thence extending across notch 63 and being adapted to be engaged at the other end 67 with a hook 68 on tightener 69. Said tightener is in the nature of a disc mounted for eccentric rotation about rod 61, there being an operating handle 70 on the disc. When the work is in place, the chain 65 is swung thereabout and engaged with hook 67 when the tightener is approximately in the dotted line position of Fig. 14. The disc is then rotated in a clockwise direction as viewed in Fig. 14, which draws the chain tightly around the work and hence draws the work firmly into notch 63, the disc being held against unintentional return to release-position by any suitable means, as, for instance, by being friction-tight on the rod 61.

Mounted for longitudinal movement through plates 57 and 58 is a gauge rod 71 which carries a stop arm 72. Rod 71 is arranged with its axis substantially parallel with that of work W and, when the gauge is not to be used, the rod may be rotated to swing arm 72 clear of the work. A sleeve 73 carries a collar 74 and is mounted on rod 71 between plates 57 and 58, the combined length of the sleeve and collar being less than the distance between plates, there thus being left room on rod 71 for an expansive spring 75 between plate 58 and the end of the sleeve. A pin 76 is adapted to be thrust through collar 74 and into any chosen hole 77 in rod 71, so the effective length or extent of rod 71 which projects to the left (Fig. 8) beyond plate 57 may be varied. Pivoted to collar 74 at 78 is a bell crank 79, one arm 80 thereof serving as a cam and the other arm 81 serving as an operating handle. When crank 79 is in the inoperative position of Fig. 12, spring 75 acts against sleeve 73 to move it to the left until the end of collar 74 engages plate 57, the distance between plate 57 and transverse lug 82 on arm 72 then being slightly greater than the distance that work W is to extend beyond plate 57 when the cut is to be made. Crank 79 is then swung into the position of Fig. 8, cam nose 80 acting against plate 57 and moving collar 74, sleeve 73 and rod 71 to the right against the action of spring 75. The various parts are so adjusted that this movement brings arm 72 and lug 82 into such a position that when work W is moved up to lug 82, as shown in Fig. 8, (it being obvious that arm 72 is swung angularly until it is in line with the work as illustrated in Fig. 9) said work will be in such a position that the cut will be properly spaced from end E of said work. The work is then clamped in position and crank 74 is swung back to the position of Fig. 12, spring 75 acting to move rod 71 to the left and lug 82 clear of end E. It follows that when the work is severed by torch T, the severed end drops freely clear instead of interfering with lug 82. To re-set the gauge, it is then merely necessary to swing crank 79 back to the position of Fig. 8.

The carriage for supporting torch T is generally indicated at C, and includes upper and lower, parallel cranks, 83 and 84, the crank shafts 85 and 86 for these cranks being supported for rotation in plates 57 and 58 and extending substantially parallel to the axis of work W. The axes of said crank shafts preferably lie in the plane of bisector 64 or the extended vertical axial plane P of the work.

A link or connecting rod 87 connects cranks 83 and 84 and is preferably adjustable with respect thereto in order that the effective lengths of the cranks may be varied, it being understood that in all positions of adjustment the connecting rod is adapted to hold the cranks in parallel relation. While the precise mechanism for adjustably connecting the cranks is not essential to the invention, I will describe the illustrated means with some particularity. Each crank arm has a longitudinally extending slot 88, a longitudinally extending row of apertures 89, and preferably, though not necessarily, carries a scale 90. For each crank there is a block 91 (Fig. 11) carrying a positioning pin 92 adapted to fit in a selected hole 89, set-bolt 93 extending through slot 88 and into block 91, so, with pin 92 in register with a selected hole 89, bolt 93 may be taken up to hold the block solidly to the crank arm.

Bolts 94 serve to hold rod 87 to block 91 but the connection between said bolts and rod are such that pivotal movement of the rod with respect to the blocks is not interfered with. Gauge marks 95 on the blocks 91 serve as a convenient means for setting said blocks, the marks and scales preferably being so arranged that they indicate the effective length of the cranks.

Torch T is clamped in vertical position to connecting rod 87 by any suitable means, for instance, by cap 96 and cap-bolts 97.

Preferably, though not necessarily, shafts 85 and 86 carry parallel cranks 83ª and 84ª connected by links 87ª, said cranks being angularly off-set with respect to cranks 83 and 84 so the crank and link mechanism may not be caught on dead center.

It will be evident that angular movement of the cranks does not vary the vertical disposition of rod 87 and torch T, and that with the link properly set with relation to the cranks, and the cranks and their crank-shafts located as described, angular movement of shafts 85 and 86 will cause torch T to follow substantially the curvature of work W.

The mechanism so far described thus is adapted to move the torch through the desired path and to maintain the torch erect throughout its movement, and, broadly considered, any means may be employed for giving angular movement to the crank shafts to bring about such torch movement. However, if the torch is to have the desired variation in speed, which particular variation and its desirability have been pointed out with some particularity in the forepart of this specification, it is necessary that the angular velocity of the crank-shafts be variable. Yet, it is desirable that the means by which the crank shafts are rotated be capable of traveling at uniform speed, particularly where it is desirable that said means be operated by such prime movers as electric motors. I have here shown means for accomplishing the speed variation but have indicated a manually operated drive shaft in place of a machine operated shaft, though it will be immediately evident that this choice is merely for the sake of simplicity and is not limitative.

I will designate worm gear 98 on shaft 86 as a compensator member, since it is by virtue of this gear or its equivalent that the desirable speed variation is accomplished. Gear 98 is eccentrically mounted on shaft 86, so, in effect, it has variable effective diameter, just as does an elliptical gear. The gear is set on the shaft so, with the torch is one or the other of its starting positions (Fig. 15 or Fig. 19), its minimum effective diameter is presented to the gear-moving means, it being observed that the gear rotates only through 180° during a single operation of the machine and therefore that we may consider only an extent of 180° of the gear as having the variational effective dimensions; in other words, when I refer to minimum and maximum effective dimensions I am referring only to such portions of the gear as are actually acted upon by the gear-moving means.

In the present instance, I have shown the gear moving means as a worm 99 mounted on drive shaft 100, said shaft being mounted for rotation in the swinging head 101. Said head is pivotally connected to plate 57 by horizontal swivel screw 102, and shaft 100 carries at its upper end a gear 103 with which meshes pinion 104 on the head-journaled shaft 105. Hand wheel 106 provides means for rotating shaft 105 and hence, through gear 103, shaft 100 and worm 99 for rotating compensator gear 98. Of course, any suitable prime mover may be operatively connected to shaft 100 to operate said compensator, it being noted that due to the provision of the latter, the drive shaft may be rotated at uniform speed to accomplish movement of the eccentric gear at variable speed. A contractile spring 107 is hooked between rod 59 and head 101 (see Fig. 14) and serves yieldingly to hold worm 99 constantly in mesh with gear 98.

With the parts in the starting position shown in Fig. 15, shaft 100 is rotated to cause coincident rotation of gear 98 and hence of crank shafts 86 and 85, this movement resulting in swinging torch T through an arcuate path, the cranks being so set that the torch substantially follows the curvature of the work or a portion of its cross-section outline, moving through a plane substantially parallel with a cross-sectional plane of the work, remaining erect and at substantially uniform distance from the work during this movement. However, as gear 98 thus rotates in a clockwise direction, as viewed in the diagrammatic figures, to accomplish the torch movement, worm 99 is constantly presented to an increasing effective diameter of gear 98 so, with uniform speed of worm 99, the angular velocity of the worm gear, crank shafts, cranks and torch is negatively accelerated. The advantageous result of this is that the horizontal torch-speed decreases as the vertical axial plane P of the work is approached, so the torch has increased time to cut through the increased vertical extent of the work. This negative acceleration continues until the torch is directly over the center of the work (Fig. 17), at which time the maximum effective diameter of gear 98 is presented to worm 99. Continued rotation of the worm carries the torch over the work center towards the other side, but the gear 98 then presents constantly diminishing diameters to the worm, so, with the worm traveling at uniform speed, the angular velocity of gear 98, the crank-shafts, cranks and torch is positively accelerated so the horizontal torch speed gradually increases as the torch travels over the gradually diminishing vertical extent of the work. The advantages of this feature is self-evident.

It will be understood the drawings and description are to be considered merely as illustrative of and not restrictive on the broader claims appended hereto, for various changes in design, structure and arrangement may be made without departing from the spirit and scope of said claims.

I claim:

1. A device of the character described, embodying a body member, means for supporting work of given variational cross-sectional characteristics in predetermined relation to the body member, a cutting torch movably mounted on the body member, and means acting automatically to move the torch across the thicker portions of the work with less speed than across the thinner portions.

2. A device of the character described, embodying a body member, means for supporting work of given cross-sectional characteristics in predetermined relation to the body member, a cutting torch movably mounted on the body member, a crank for moving the torch through a path substantially following the cross-section outline of the work, a drive shaft, an operative connection between the shaft and crank, and means in said connection whereby drive-shaft movement of uniform angular velocity imparts movement to the crank of variable angular velocity.

3. A device of the character described, embodying a body member, means for supporting work of given cross-sectional characteristics in predetermined relation to the body member, a cutting torch movably mounted on the body member, a crank for moving the torch through a path substantially following the cross-section outline of the work, a drive shaft, an operative connection between the shaft and crank, means in said connection whereby drive-shaft movement of uniform angular velocity imparts movement to the crank of variable angular velocity; and means adapted to maintain the torch substantially erect during its movement.

4. A device of the character described, embodying a body member, a pair of crank shafts on the body member, a pair of cranks, one on each shaft, a connecting rod between the cranks and holding them in parallel relation, a drive shaft, an operative connection between the drive shaft and crank shafts, and means in said connection whereby uniform speed of the drive shaft imparts variable speed to the crank shafts.

5. A device of the character described, embodying a body member, a crank shaft, a crank on said shaft, a torch supported by the crank, a bodily movable drive shaft on the body member, a gear element on said drive shaft, a gear element eccentrically mounted on said crank shaft, and yieldable means adapted to hold the gear elements in mesh.

6. A device of the character described, embodying a body member, a gage rod slidable longitudinally through the body member, means for limiting the extent of longitudinal movement of the rod, and spring means adapted to hold the rod yieldably at one limit.

7. A device of the character described, embodying a body member, a gage rod slidable longitudinally through the body member, means for limiting the extent of longitudinal movement of the rod, spring means adapted to hold the rod yieldably at one limit, and cam means adapted to move the rod against the action of the spring means.

8. A device of the character described, embodying a body member, a gage rod slidable longitudinally through the body member, means for limiting the extent of longitudinal movement of the rod, spring means adapted to hold the rod yieldably at one limit, and cam means adapted to move the rod against the action of the spring means and to the other limit.

9. A device of the character described, embodying a body member, means for supporting work in predetermined relation to the body member, a cutting torch movably mounted on the body member, means for guiding the torch across the work through a predetermined path, and means acting automatically to move the torch through said path across the work with predetermined varying speed.

10. A device of the character described, embodying a body member, a crank shaft supported by said body member, a crank on said shaft, a torch supported by the crank, a drive shaft supported by said body member, a pair of gear elements, one on each shaft, said elements being operatively connected whereby drive shaft rotation sets up crank shaft rotation, one of said gear elements having portions of variable effective radius whereby uniform speed of the drive shaft imparts variable speed to the crank shaft.

11. A device of the character described, embodying a body member, a crank shaft supported by the body member, a crank on said shaft, a torch supported by the crank, a head mounted on the body member for swinging movement, a drive shaft supported by the head and movable therewith, a pair of meshed gear elements, one on each of said shafts, one of said elements being of variable effective diameter, said drive shaft being adapted to swing with said head to compensate for the variable characteristics of said one element.

In witness that I claim the foregoing I have hereunto subscribed my name this 3rd day of September, 1926.

JAMES ORRIN BISHOP.